March 29, 1960 R. J. VOSEN 2,930,650
GLARE SHIELD FOR MOTOR VEHICLES
Filed July 11, 1958
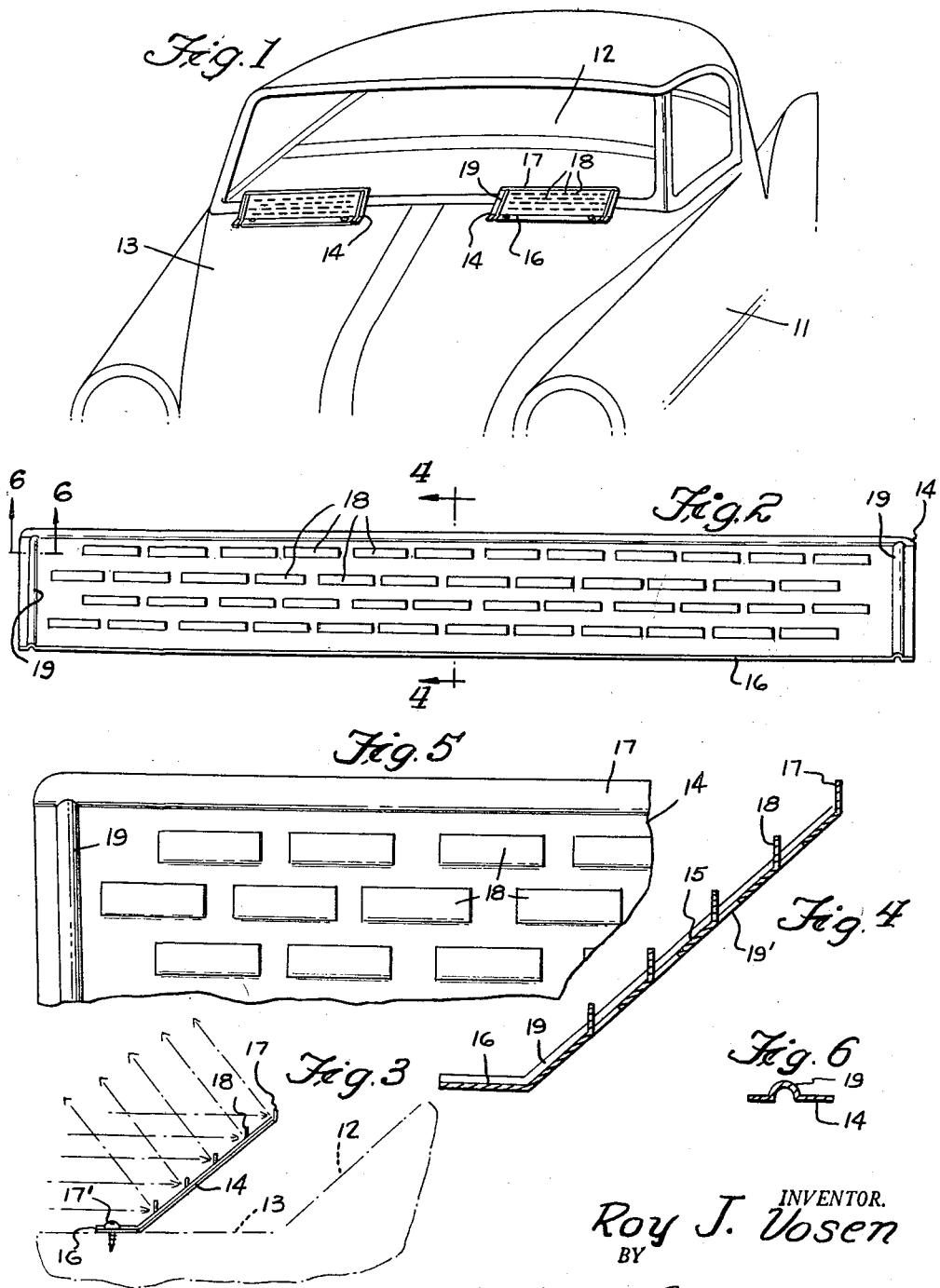
INVENTOR.
Roy J. Vosen
BY
McMorrow, Berman + Davidson
ATTORNEYS

2,930,650
GLARE SHIELD FOR MOTOR VEHICLES

Roy J. Vosen, Coeur d'Alene, Idaho

Application July 11, 1958, Serial No. 747,884

2 Claims. (Cl. 296—97)

This invention relates to glare shields, and more particularly to a glare shield for use on an automobile.

The main object of the invention is to provide a novel and improved glare shield adapted to be employed on an automobile to protect the driver and occupants of the automobile from glare produced by the headlights of approaching vehicles, and other sources forwardly of the equipped vehicle, the glare shield being simple in construction, being easy to install on a motor vehicle, and being relatively compact in size.

A further object of the invention is to provide an improved glare shield for a motor vehicle adapted to be mounted forwardly adjacent the occupants of the front seat of a vehicle, said glare shield being inexpensive to manufacture, being durable in construction, and providing no interference with normal vision through the windshield of the vehicle.

Further objects and advantages of the invention will become apparent from the following description and claims, and from the accompanying drawings, wherein:

Figure 1 is a fragmentary front perspective view of an automobile equipped with a pair of glare shields constructed in accordance with the present invention.

Figure 2 is an enlarged front elevational view of one of the glare shields employed in Figure 1.

Figure 3 is an enlarged side elevational view of one of the glare shields employed in Figure 1.

Figure 4 is an enlarged transverse vertical cross sectional view taken through the glare shield of Figure 2 on the line 4—4.

Figure 5 is an enlarged plan view of a corner portion of the glare shield of Figure 2.

Figure 6 is an enlarged cross sectional detail view taken on the line 6—6 of Figure 2.

Referring to the drawings, 11 designates a conventional motor vehicle having a windshield 12 and a hood 13. Designated at 14, 14 are a pair of glare shields according to the present invention which are mounted on hood 13 forwardly adjacent the windshield 12 and in positions to shield the occupants of the front seat of the vehicle from glare derived from the headlights of an approaching vehicle or any other source.

Each glare shield 14 comprises a body of rigid sheet material which is generally rectangular in shape and which has a highly reflective forward surface 15. Each glare shield 14 is formed at its lower margin with a flange 16 which is inclined at an obtuse angle to the main portion of the glare shield, as is clearly shown in Figure 4, the flange 16 being adapted to be fastened to the hood 13 of an automobile in any suitable manner, as by sheet metal screws 17', as shown in Figure 3.

Each glare shield 14 is formed at its upper edge with an upstanding flange 17 which is perpendicular to the base flange 16, and which is therefore at an obtuse angle to the main body of the glare shield. The main body of the glare shield is further formed with a plurality of rows of upstanding vanes or louvers 18, said vanes or louvers being struck upwardly, leaving slots 19', as shown in Figure 4, the louvers being arranged parallel to the top flange 17 and being thus perpendicular to the base flange 16. As shown in Figure 2, the vanes or louvers 18 are arranged in staggered horizontal rows and preferably at least four rows are provided.

The main body of the glare shield is formed at its opposite side margins with the corrugations 19, 19 to stiffen the shield, whereby sheet material of minimum thickness may be employed.

The large shields 14, 14, being located on the hood 13 and below the plane of vision of the operator and the passenger in the front seat of the vehicle do not interfere with direct vision through the windshield 12. However, rays of light from the headlights of an approaching vehicle or other source of glare impinge upon the inclined reflective main surfaces of the shield members 14 and 15 and are deflected upwardly, and likewise impinge upon the reflective upstanding louvers 18 and are deflected away from the vehicle occupants. Thus, the major portion of the light from the source of glare is diffused upwardly and away from the occupants of the vehicle and cannot be reflected from the polished top surface of the hood 13 into the passenger compartment of said vehicle. Thus, the glare shields 14, 14 act not only to intercept and deflect direct light from sources forwardly of the vehicle, but also serve to intercept light from glare sources which would otherwise be reflected from the polished surfaces of the hood 13 and which would interfere with the normal vision of the driver and other occupants of the motor vehicle 11.

As shown in Figure 3, the glare shields 14, 14 may be arranged in suitable upwardly and rearwardly inclined positions, for example, may be arranged parallel to the lower portion of the windshield 12. The angular position of the main body portion of the glare shield will of course be determined by the angle between said main body and the base flanges 16.

While a specific embodiment of an improved glare shield for a motor vehicle has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. In a motor vehicle, a windshield, and a glare shield mounted on the vehicle forwardly adjacent said windshield, said glare shield comprising a body of rigid sheet material formed with a forwardly extending bottom flange and with a plurality of closely spaced horizontal rows of successive inclined reflective vane elements struck up from the body and distributed over the major portion of the area of said body and adapted to deflect light rays away from the windshield, the successive rows of vane elements being staggered relative to each other.

2. In a motor vehicle, a windshield, and a glare shield mounted on the vehicle forwardly adjacent the bottom of said windshield, said glare shield comprising a body of rigid reflective sheet material formed with a forwardly extending bottom flange and with a plurality of closely spaced horizontal rows of successive upwardly inclined louvers struck up from the body and distributed over the major portion of the area of said body, louvers being substantially perpendicular to said bottom flange and adapted to deflect light rays away from the windshield, the successive rows of louvers being staggered relative to each other.

References Cited in the file of this patent

UNITED STATES PATENTS

| 1,388,221 | Toepfer et al. | Aug. 23, 1921 |
| 2,117,181 | Lamar | May 10, 1938 |
| 2,253,766 | Crowell | Aug. 26, 1941 |
| 2,683,498 | Van Schaack | July 13, 1954 |

FOREIGN PATENTS

| 734,735 | Great Britain | Aug. 3, 1955 |
| 1,098,553 | France | Mar. 9, 1955 |